United States Patent
Kai

(10) Patent No.: US 7,595,908 B2
(45) Date of Patent: Sep. 29, 2009

(54) PRINTER CONTROL APPARATUS AND METHOD

(75) Inventor: Hiroshi Kai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 11/889,696

(22) Filed: Aug. 15, 2007

(65) Prior Publication Data

US 2008/0212125 A1 Sep. 4, 2008

Related U.S. Application Data

(62) Division of application No. 10/428,752, filed on May 5, 2003, now Pat. No. 7,280,243.

(30) Foreign Application Priority Data

May 9, 2002 (JP) ............................. 2002-134406

(51) Int. Cl.
*G06F 15/00* (2006.01)
*B41J 2/195* (2006.01)
(52) U.S. Cl. .......................................... 358/1.15; 347/7
(58) Field of Classification Search ............... 358/1.15, 358/1.13, 1.18, 1.1; 399/10, 12, 25, 43; 347/7, 347/19, 23, 85, 86; 400/207, 208, 88, 613; 380/231, 232; 713/193; 604/232
See application file for complete search history.

(56) References Cited

U.S. PATENT DOCUMENTS 5,812,902 A * 9/1998 Lee .............................. 399/25

5,949,447 A 9/1999 Arai et al. ..................... 347/23

FOREIGN PATENT DOCUMENTS

| JP | 7-205419 | 8/1995 |
|---|---|---|
| JP | 8-224891 | 9/1996 |
| JP | 9-30006 | 2/1997 |
| JP | 2001-232785 | 8/2001 |

\* cited by examiner

*Primary Examiner*—Saeid Ebrahimi Dehkordy
(74) *Attorney, Agent, or Firm*—Fitzpatrick, Cella, Harper & Scinto

(57) ABSTRACT

The invention seeks to improve the accuracy of management of remaining amount of ink in a printer in which remaining amount of ink is managed based upon amount of ink consumed. If a print job is sent to a printer, first the printer is requested for status information that includes a warning concerning remaining amount of ink. When the status information is received from the printer, it is determined whether the status information indicates the possibility that ink has been replaced. If the information indicates such possibility, then the user is prompted to enter the nature of the ink replacement. If the user makes an entry to the effect that the ink replacement was performed, then the current status information of the printer is acquired again and discriminated. If possibility that ink has been replaced is indicated in this status information as well, then the printer is sent a command for initializing the information relating to remaining amount of ink.

12 Claims, 10 Drawing Sheets

FIG. 3

| 1Bh | S | T | S | 00h | 16h | R | E | Q | = | E | R | R | , | W | R | N | , | C | H | G | , | P | A | G | ; |

FIG. 4

| 00h | 18h | E | R | R | = | 0 | , | W | R | N | = | 0 | , | C | H | G | = | 1 | , | P | A | G | = | 0 | ; |

FIG. 5

| 00h | 18h | E | R | R | = | 0 | , | W | R | N | = | 0 | , | C | H | G | = | 0 | , | P | A | G | = | 0 | ... |

FIG. 6

PrinterA–PORT1:

DATA CANNOT BE TRANSMITTED TO PORT 1.
IF TRANSMISSION OF DATA IS TO BE RETRIED, CLICK "RETRY" BUTTON.
IF JOB IS TO BE CANCELLED, CLICK "CANCEL" BUTTON.
RETRY WILL BE PERFORMED AUTOMATICALLY IN FIVE SECONDS.

[ RETRY ]    [ CANCEL ]

FIG. 7

CONFIRM INK REPLACEMENT OPERATION

IT IS POSSIBLE THAT AN INK TANK WAS REPLACED AFTER THE PRECEDING PRINTING OPERATION.
DO YOU WISH TO REPLACE AN INK TANK?
TO CHANGE AN INK TANK, CLICK "YES".
TO NOT CHANGE AN INK TANK, CLICK "NO".

[ YES ]   [ NO ]

FIG. 8

CONFIRM INK REPLACEMENT OPERATION

SELECT ALL INK TANKS REPLACED, AND CLICK "OK"

☐ BLACK-INK TANK
☐ COLOR-INK TANK

[ OK ]    [ CANCEL ]

FIG. 9

| 1Bh | C | M | D | 00h | 0Ch | R | S | T | = | B | K | , | C | L | ; |

PRINTER CONTROL APPARATUS AND METHOD

This application is a division of application Ser. No. 10/428,752, filed May 5, 2003, the contents of which is incorporated herein by reference.

FIELD OF THE INVENTION

This invention relates to a printer control apparatus such as a host computer that transmits print data to a printer, and to a related control method. More particularly, the invention relates to management of remaining amount of ink in a printer.

BACKGROUND OF THE INVENTION

A known method of measuring amount of ink remaining in an ink-jet printer and notifying the user of the timing for ink replacement is a method of recording total amount of ink used from the start of use of each ink tank and prompting the user to effect ink replacement when the total amount of ink used approaches total amount of ink loaded into each ink tank beforehand. Another method involves, conversely, subtracting amount of ink used from an initial value that is based upon the total amount of ink loaded in an ink tank beforehand, and prompting the user to effect ink replacement when the value of the difference falls below a fixed value. Since these methods do not require sensors or the like for directly measuring amount of remaining ink, they are often used in ink-jet printers of comparatively inexpensive type. In order to monitor remaining amount of ink correctly with these methods, it is required that a counter for measuring amount of ink used be initialized correctly when the user performs ink replacement.

A known method of initializing the counter for measuring amount of ink used is a method of monitoring the ink-tank exchange operation at the printer and, if the exchange has been performed, regarding this as indicating that the ink tank has been exchanged for a new tank and initializing the counter automatically (see the specification of Japanese Patent Application Laid-Open No. 09-30006).

Another method involves initializing the counter for measuring amount of ink used by having the user perform a predetermined counter initializing operation after ink replacement is carried out (see the specification of Japanese Patent Application Laid-Open No. 8-224891). To facilitate operation, there are cases where a GUI (Graphical User Interface) for initializing the counter is presented on the screen of a host computer connected to the printer, a command for initializing amount of ink used is transferred to the printer by clicking a button on the GUI, and the counter is initialized in response to this command.

The above-described methods have certain problems. With the method of initializing the counter for measuring amount of ink used automatically upon sensing the ink-tank replacement operation, the counter is initialized automatically in a case where replacement has been sensed. As a consequence, the counter is initialized even in a case where the actual remaining amount of ink has not changed, as when an ink tank still in use is temporarily removed and then re-inserted. This means that the counter will not correctly reflect the amount of ink remaining in this ink tank. In order to avoid this problem, the ink tank may be provided with a microchip for identifying the particular ink tank. However, this leads to higher cost.

Further, with the method in which the user performs the operation for initializing the counter for amount of ink used after the ink replacement operation, the counter will not correctly reflect the amount of ink used in a case where the user has not performed the counter initializing operation.

SUMMARY OF THE INVENTION

Accordingly, an object of the present invention is to provide a printer control apparatus and method through which it is possible to execute, easily and reliably, initialization of information relating to amount of ink remaining in a printer that obtains the remaining amount from amount of ink used.

Another object of the present invention is to provide a printer control apparatus and method that eliminate the aforementioned problem, namely the fact that information relating to remaining amount of ink cannot be maintained accurately, even in a case where a plurality of printer control apparatus are connected to a single printer and an operation for initializing the information relating to remaining amount of ink is performed independently from each of the plurality of printer control apparatus.

According to the present invention, the foregoing objects of the present invention are attained by providing a printer control apparatus connected to a printer for updating and storing information relating to remaining amount of colorant based upon amount of colorant used, outputting, in response to a request, status information that includes the above information and information indicating possibility of colorant replacement, and initializing, in response to a request, the information relating to remaining amount of colorant and the information indicating possibility of colorant replacement, the apparatus comprising: status receiving means for requesting the printer for transmission of the status information and receiving the status information from the printer; confirmation means for prompting a user to enter the nature of a colorant replacement operation in a case where possibility of colorant replacement is being indicated in the status information received by the status receiving means; and command transmitting means for transmitting a command, which is for initializing the information relating to remaining amount of colorant and the information relating to possibility of colorant replacement, to the printer in a case where the fact that the colorant replacement operation has been performed has been entered by the confirmation means.

This arrangement is advantageous in that initialization of information relating to remaining amount of colorant, which is necessary when the colorant is replaced, is performed easily and reliably with regard to a printer in which information relating to the remaining amount of toner is managed based upon the amount of colorant used.

Preferably, the confirmation means prompts the user to enter the nature of the colorant replacement operation in a case where transmission of print data, which is accompanied by consumption of colorant, to the printer has been requested.

This arrangement is advantageous in that it is possible to avoid the troublesome task in which the user must make an input relating to replaced colorant in a case where an operation that is not accompanied by consumption of colorant has been performed.

Preferably, the command transmitting means transmits the command, which is for initializing the information relating to remaining amount of colorant and the information relating to possibility of colorant replacement, to the printer if, in a case where the fact that the colorant replacement operation has been performed has been entered by the confirmation means, the status information is received from the printer by the status receiving means and possibility of colorant replacement is being indicated in the status information.

This arrangement is advantageous in that it is possible to avoid sending the printer the command for initializing information relating to remaining amount of colorant a number of times even in a case where the operation for initializing the information relating to remaining amount of colorant is performed at the same time from a plurality of printer control apparatus, and therefore it is possible to avoid improper initialization of the information relating to amount of toner remaining in the printer.

Preferably, the colorant includes colorants of a plurality of color components, the confirmation means enters type of colorant replaced as the nature of the colorant replacement operation, and the command transmitting means transmits a command for initializing information relating to remaining amount of colorant of the entered type.

By virtue of this arrangement, information relating to remaining amount of a colorant can be initialized in regard to a replaced colorant, and management of remaining amount of colorant can be performed accurately.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 3 is a diagram illustrating an example of a status request command for transferring, to a printer, the data-transfer control program that operates in the host computer according to the first embodiment;

FIG. 4 is a diagram illustrating an example of printer status information transmitted by the printer and received by the host computer in the first embodiment;

FIG. 5 is a diagram illustrating an example of printer status information that the printer transmits to the host computer in the first embodiment;

FIG. 6 is a diagram illustrating an example of display of a communication-error dialog box displayed by the data-transfer control program that operates in the host computer according to the first embodiment;

FIG. 7 is a diagram illustrating an example of display of an ink-replacement confirmation dialog box displayed by the data-transfer control program that operates in the host computer according to the first embodiment;

FIG. 8 is a diagram illustrating an example of display of an ink-replacement confirmation dialog box displayed by the data-transfer control program that operates in the host computer according to the first embodiment; and FIG. 9 is a diagram illustrating an example of a command transmitted from the host computer to the printer according to the first embodiment, wherein the command initializes information relating to amount of ink remaining in the printer and commands that information indicating whether or not an ink replacement operation has been performed is changed to information indicating that the ink replacement operation has not been performed.

DETAILED DESCRIPTION OF THE PREFERRED EMBODIMENT

A preferred embodiment of the present invention will now be described in detail with reference to the accompanying drawings.

First Embodiment

Reference will be had to FIGS. 1 to 10 to describe in detail the structure and operation of a printer control apparatus according to a first embodiment of the present invention.

Figure 1:
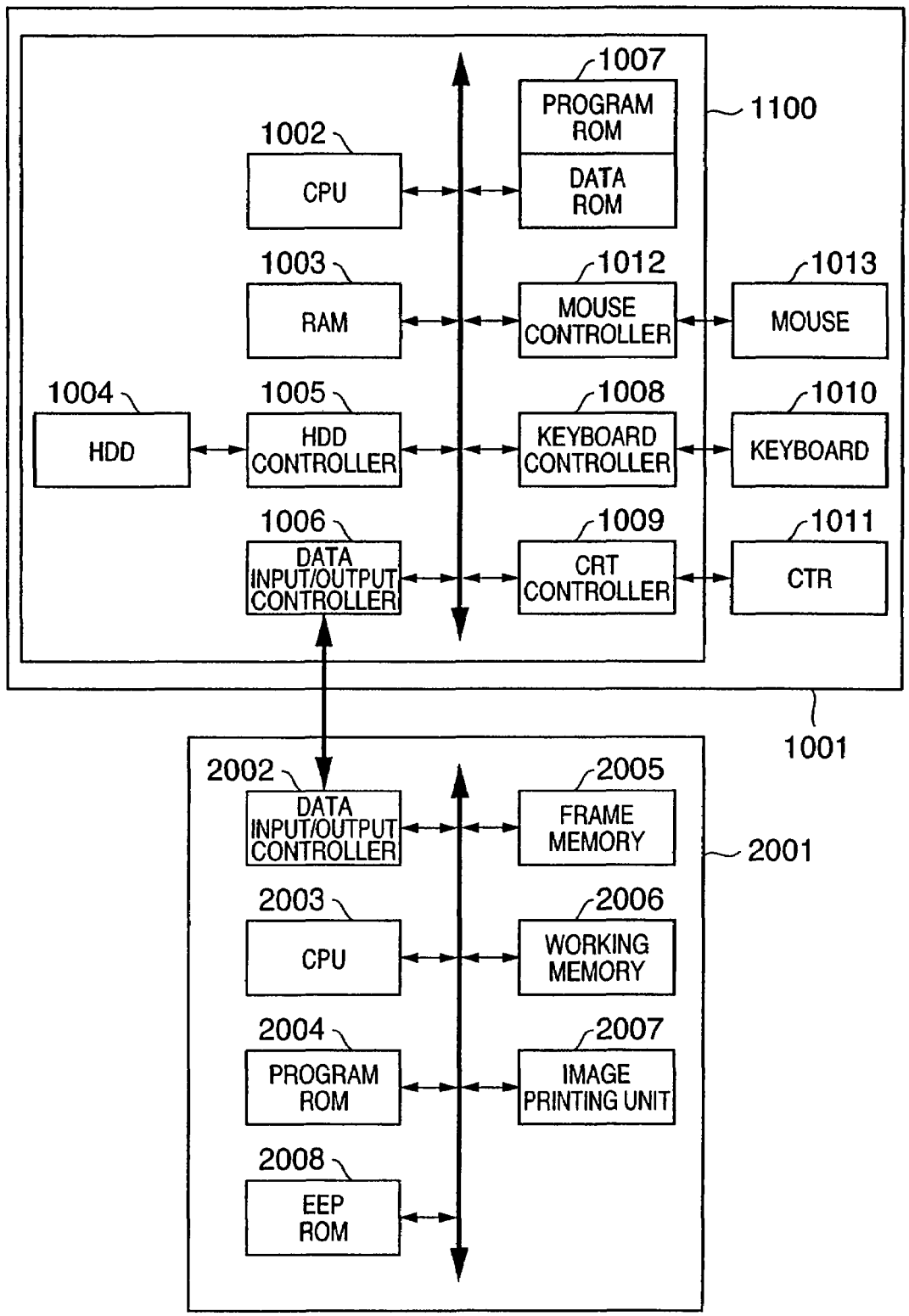
FIG. 1 is a block diagram illustrating the configuration of a system comprising a host computer and printer according to a first embodiment of the present invention.
Figure 2:
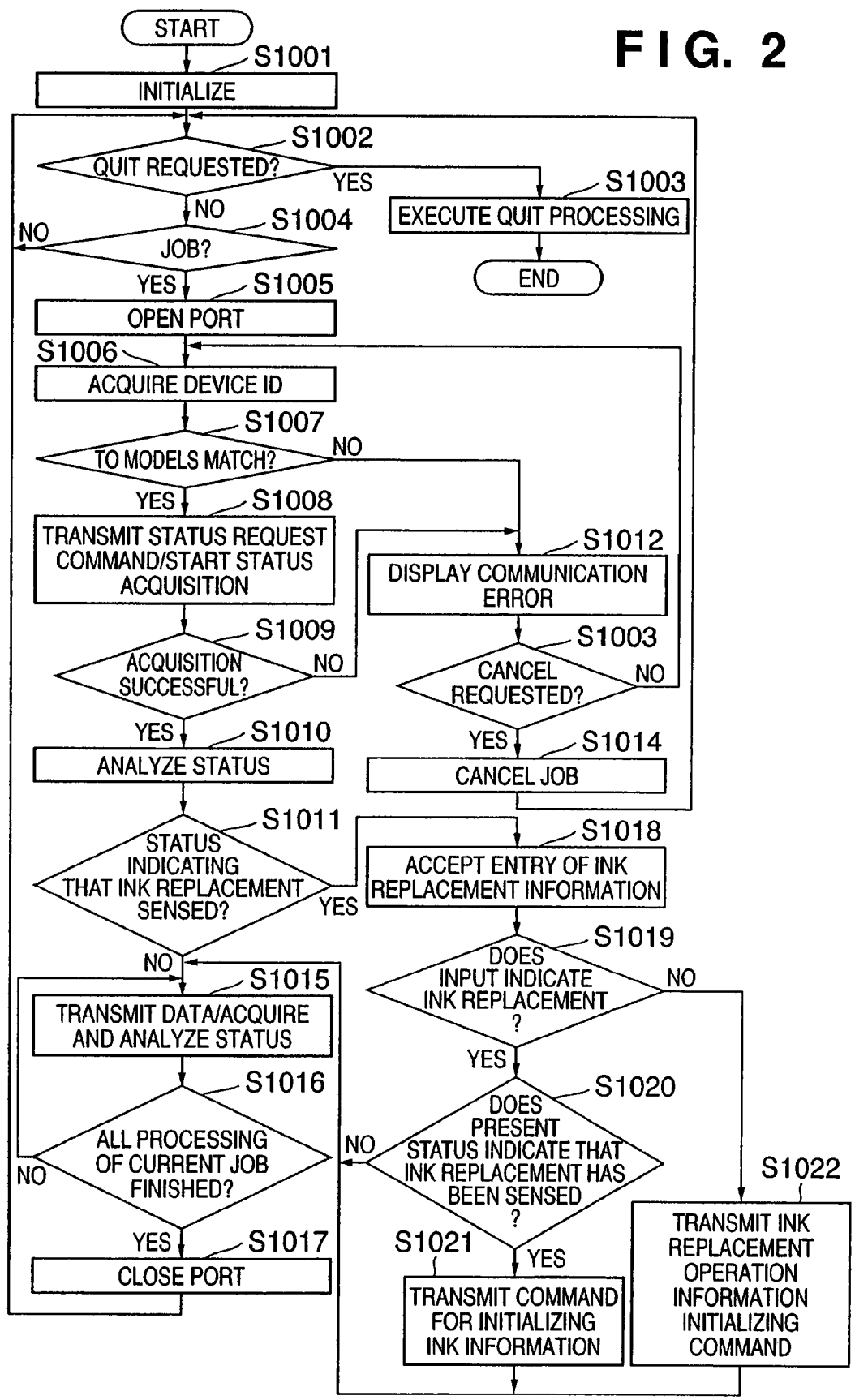
FIG. 2 is a flowchart illustrating processing of a data-transfer control program that operates in a host computer according to the first embodiment.
Figure 3:
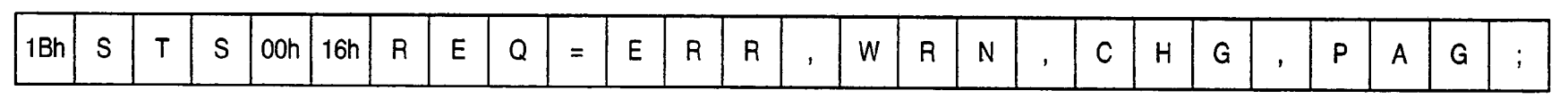
Figure 4:
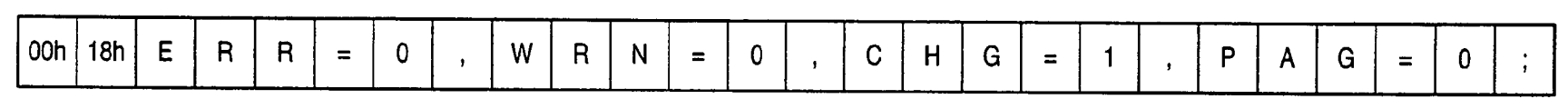
Figure 5:
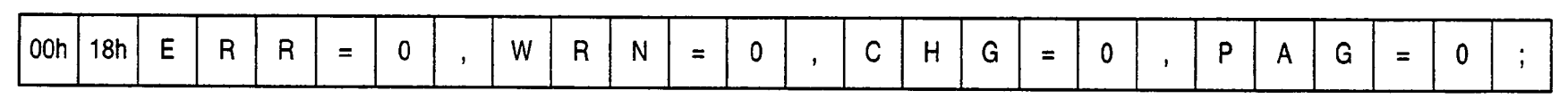
Figure 9:
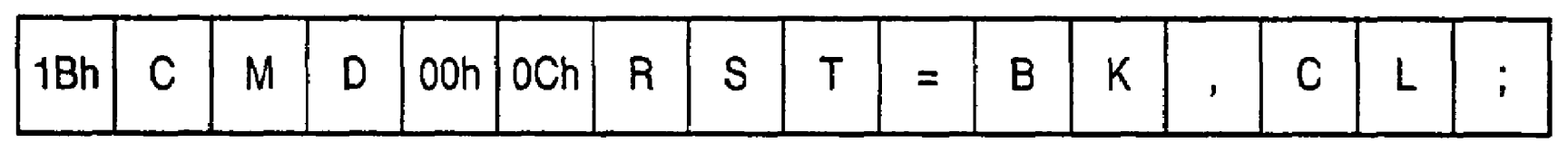
Figure 10:
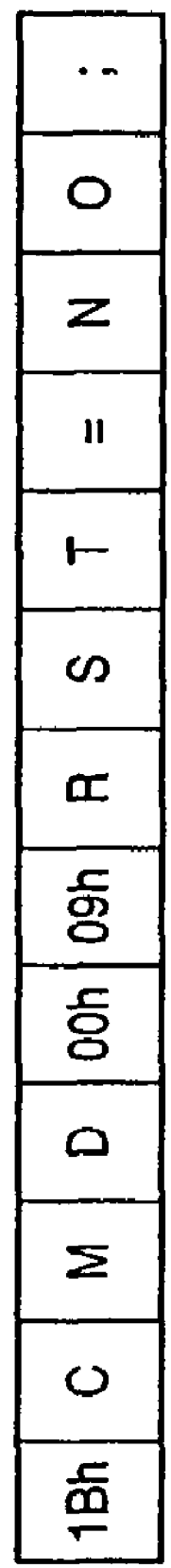
FIG. 10 is a diagram illustrating an example of a command transmitted from the host computer to the printer according to the first embodiment, wherein the command does not initialize information relating to amount of ink remaining in the printer and commands that information indicating whether or not an ink replacement operation has been performed is changed to information indicating that the ink replacement operation has not been performed.

FIG. 1 is a block diagram illustrating the configuration of a system according to this embodiment; FIG. 2 is a flowchart illustrating processing of a data-transfer control program that controls data transfer processing of a host computer 1001 serving as the printer control apparatus of this embodiment; FIG. 3 illustrates an example of a status-request setting command transmitted from the host computer 1001 to a printer 2001 in order to perform a status-request setting; and FIG. 4 illustrates an example of status information, which represents status of the printer 2001, transmitted from the printer 2001 to the host computer 1001. FIG. 4 indicates that an operation that is possibly ink replacement by the user has been sensed at the printer 2001. FIG. 5 shows an example of status information, which represents the status of the printer 2001, transmitted from the printer 2001 to the host computer 1001. This indicates that an operation that is possibly ink replacement by the user has not been sensed at the printer 2001. FIG. 6 shows an example of display of a dialog box displayed in a case where a data-transfer control program that operates in the host computer 1001 cannot communicate with the printer normally. FIG. 7 shows an example of display of a dialog box for confirming an ink replacement operation. This dialog box is displayed in a case where the printer 2001 indicates that an operation that is possibly ink replacement has been sensed when the data-transfer control program that operates in the host computer 1001 attempts to transfer job data to the printer 2001. FIG. 8 shows an example of display of a dialog box for specifying type of ink tank replaced. This dialog box is displayed following display of the dialog box of FIG. 7 in a case where the user has performed an operation (clicking of a "YES" button) in the dialog box of FIG. 7 indicating that the user actually performed ink replacement. FIG. 9 shows an example of a command specifying resetting of information indicative of remaining amount of ink and changing information indicating whether or not an ink replacement operation has been performed into information indicating that the ink replacement operation has not been performed. This command is transmitted to the printer 2001 in advance of job data in a case where an "OK" button has been clicked by the user following selection of ink-tank type in the dialog box of FIG. 8. FIG. 10 shows an example of a command specifying no-resetting of information indicative of remaining amount of ink and changing information indicating whether or not an ink replacement operation has been performed into information indicating that the ink replacement operation has not been performed. This command is transmitted to the printer 2001 in advance of job data in a case where an operation (click of "NO" button) indicating that the user has not replaced the ink is done by the user in the dialog box of FIG. 7.

In FIG. 1, the host computer 1001 in the system of this embodiment converts data, which is a mixture of characters, graphics and images generated by an application program or the like within a hard disk (described later), to print data by a printer control program within the same hard disk and outputs the print data to the printer 2001 via the data-transfer control program, whereby the print data is printed out.

The host computer 1001 has a main unit 1100 controlled by a CPU 1002. A program that operates in the host computer 1001 is loaded in a RAM 103, and the RAM 103 is used as a working memory of the program during operation. A hard disk 1004, in addition to storing various programs such as a printer control program and data-transfer control program inclusive of an operating system and application program, stores data necessary when each of the programs operates.

A hard-disk controller 1005 controls the writing and reading of data and programs to and from the hard disk 1004. A data input/output controller 1006 transfers printer commands and data, which have been generated by the above-mentioned printer control program, to the printer side and receives and temporarily retains data sent from the printer side. The data input/output controller 1006, which is connected to the printer 2001 by a bidirectional data communication interface, sends data to and receives data from the printer 2001.

A ROM 1007 stores programs and data for various basic operations, such as execution of programs in the host computer 1001 and execution of control by various controllers. A keyboard controller 1008 controls inputs from keys of a keyboard 1010 connected to the host computer 1001, a mouse controller 1012 controls inputs from a mouse 1013 connected to the host computer 1001, and a CRT controller 1009 controls display on a display CRT 1011.

Further, the printer 2001 in the system of this embodiment accepts print data from the host computer 1001 and prints this as an image on printing paper. The printer 2001 sends the host computer 1001 status data representing the status of the printer 2001.

A data input/output controller 2002 receives print data transferred to the printer 2001 from the host computer 1001 and transfers information from the printer side to the host computer 1001. A CPU 2003 controls the printer per se. A program ROM 2004 stores programs for executing a series of printer operations such as outputting of print data received from the host computer 1001.

A frame memory 2005 holds an image pattern that has been generated by a program within the program ROM 2004. A working memory 2006 is used in various processing for image printing, such as image-data rendering processing, and processing for communicating with the host computer 1001. An image printing unit 2007 prints an image pattern, which is held in a frame memory 2005, on paper using a colorant such as ink. Various information is recorded in an EPROM 2008. This information includes maintenance information such as a running total of number of prints made by the printer, information relating to remaining amount of each ink, and information indicating whether an ink replacement operation has been performed.

User access to an ink tank of the image printing unit 2007 can be recognized by the CPU 2003 by an interrupt signal from the image printing unit 2007. If access to the ink tank has been recognized, content representing that an operation that is possibly ink-tank replacement has been performed is recorded as ink-replacement operation information provided in a prescribed area of the EPROM 2008. With regard to the content of the recorded ink-replacement operation information, information relating to remaining amount of ink ("residual-ink information") is initialized, and the ink-replacement operation information is changed to content indicating that an ink replacement operation has not been performed, by an ink-information initializing command transmitted from the host computer 1001. Accordingly, until the content is changed by the ink-information initializing command, the ink-replacement operation information continues to be held as content indicating that an operation that is possibly ink-tank replacement has been performed. For example, if the printer is equipped with a sensor for sensing opening/closing of a cover that is opened when an ink tank is replaced, then, when the printer senses that the cover has been opened, content to the effect that an operation that is possibly ink-tank replacement has been performed is recorded as the ink-replacement operation information. In addition, content indicating that an operation that is possibly ink-tank replacement has been performed can also be recorded as the ink-replacement operation information in a case where a button for moving a printhead-mounting carriage to a home position for the sake of ink-tank replacement has been operated.

If ink has been consumed in the printer 2001 by printing using the image printing unit 2007 or by a cleaning process, the remaining amount of ink is calculated based upon the amount consumed and is recorded as residual-ink information in a prescribed area of the EPROM 2008. The residual-ink information is such that zero is adopted as the initialized state (unused state) with regard to the ink of each color, after which updating is performed by adding on amount of ink used subsequently. A threshold value for alerting of the fact that little ink remains is set beforehand for the ink of each color. If the value indicated by the residual-ink information updated by addition exceeds the threshold value, this is reflected in the status information as a residual-ink warning state. The residual-ink information is initialized by the ink-information initializing command transmitted from the host computer 1001.

Furthermore, the printer 2001 supports a function that transmits the printer-status information to the host computer. When the host computer has issued a request for transmission of the status information, the printer 2001 sends the host computer information indicating whether the printer has produced an error or warning, the type thereof if an error or warning has occurred, and ink-replacement operation information indicating whether an operation that is possibly ink-tank replacement has been performed at the printer. Types of warnings include a residual-ink warning state indicating that the amount of remaining ink has fallen below a fixed level.

The data input/output controller 1006 of FIG. 1 constitutes status receiving means for requesting the printer 2001 to transmit status information and for receiving transmitted status information. The data input/output controller 1006 further constitutes command transmitting means that sends the printer 2001 an ink-information initializing command for specifying initialization of the information relating to remaining amount of ink recorded in the EPROM 2008 and for specifying that the ink-replacement operation information indicating whether an ink replacement operation has been performed is to be changed to content indicating that the ink-replacement operation has not been performed. The CPU 1002, keyboard controller 1008, CRT controller 1009, keyboard 1010, CRT 1011, mouse controller 1012 and mouse 1013 constitute ink-replacement confirmation means which, on the basis of status information received by the status receiving means indicating whether the printer ink-tank replacement operation has been performed, prompts the user to enter the nature of an actual ink replacement operation in a case where status information indicating that the ink replacement operation has been performed has been reported. The status information indicating whether the printer ink-tank replacement operation has been performed is status information transmitted from the printer 2001 based upon the ink-replacement operation information stored in the EPROM 2008 of the printer 2001.

(Description of Processing)

Processing executed by the printer control apparatus of this embodiment will be described with reference to FIGS. 2 to 10.

The operation of the data-transfer control program that operates in the host computer 1001 will be described first with reference to FIG. 2. FIG. 2 is a flowchart illustrating processing of the data-transfer control program that operates in the host computer 1001. In print processing by the host computer 1001, data such as a document or image created by an application program is converted to print data by a program referred to as a printer driver, and the print data is spooled by a print spooler provided by the operating system. The print spooler launches the data-transfer control program so that the print data is transferred to the printer. The data-transfer control program receives the device ID of the printer so that communication with the printer can be performed correctly. To this end, it checks to determine whether the printer model coincides with the model of the printer assumed to be that to which the print data is to be transferred. Furthermore, the data-transfer control program acquires from the printer the information as to whether the printer has produced an error or warning and the status representing the type of error or warning. If there is no problem, the program transfers the print data to the printer. If there is a problem, the program seeks user support. Since the operation of the printer driver and print spooler is not directly related to this embodiment, a description thereof is omitted here.

In FIG. 2, the data-transfer control program is loaded in the RAM 1003 and called by the print spooler, whereupon initialization processing is executed first (S1001). Here a memory area used by the program is acquired and variables are initialized.

Whether a quit request has been issued by the print spooler is determined at step S1002. If the request has been issued, control proceeds to step S1003, quit processing is executed and the program is exited. The quit processing of step S1003 frees the memory area used by the program.

If the quit request has not been issued by the print spooler, control proceeds to step S1004. If job start and data transfer are commanded (functions called) from the printer spooler at step S1004, control proceeds to step S1005. Otherwise, the processing of steps S1002 to S1004 is repeated until the print spooler either issues the quit request or commands job start.

If job start and data transfer have been commanded from the print spooler, control proceeds to step 1005. Here a port specified by commanding of job start and data transfer is opened and the device ID is received from the printer (step S1006). The device ID includes information indicating the printer model. On the basis of this information, it can be determined whether the model of the connected printer agrees with the model of the printer supported by the data-transfer control program.

Next, at step S1007, it is determined whether the device ID has been acquired correctly and whether printer model information contained in the acquired device ID agrees with the model of the printer supported by the data-transfer control program. If it is determined that the device ID could be acquired correctly and that the models agree, control proceeds to step S1008. If it is determined that the device ID could not be acquired correctly or that the models do not agree, control proceeds to step S1012.

A dialog box indicating that communication with the printer cannot be performed correctly is displayed at step S1012. This display is performed by the print spooler. If the data-transfer control program issues an error response with respect to the function call commanding data transfer from the printer spooler, the dialog box is displayed. The dialog box, which is as shown in FIG. 6, makes it possible for the user click a "RETRY" button or "CANCEL" button. If the "RETRY" button is clicked, the print spooler again issues the function call to the data-transfer control program to command data transfer, and therefore the data-transfer control program executes processing from step S1006 onward. In a case where a fixed period of time elapses without the user making any entry in the dialog box, processing similar to that executed when the "RETRY" button is clicked is executed. If the "CANCEL" button in the dialog box is clicked, the print spooler executes processing to cancel the job. At this time the print spooler issues the function call to the data-transfer control program to command job quit, and therefore the data-transfer control program executes job-quit processing, such as processing for closing the port, after which control proceeds to step S1002. Here the host computer waits for a quit request or a request for start of a new job.

At step S1008, a status request command it transmitted to printer 2001. If transmission is successful, processing for receiving status from the printer is started. The status request command has the content shown in FIG. 3 by way of example. The command shown in FIG. 3 includes an escape sequence (1Bh, "S", "T", "S") indicating that the command is a status request command, 2-byte information (0016h) representing the command size, a command (REQ) requesting the printer 2001 for status, and the type of status information requested. In the example of the command shown in FIG. 3, the command requests transmission of error information (ERR), warning information (WRN), ink replacement information (CHG) and page information (PAG). Upon receiving the status request command, the printer 2001 operates so as to transmit the status information specified by the status request command whenever there is a status transmit request from the host computer 1001 until the power supply of the printer 2001 is turned off or until commanded by another status request command. After transmitting the status request command, the host computer requests the printer for transmission of status as necessary and acquires the status.

Control proceeds to step S1012 in a case where transmission of the status request command failed at step S1008 or in a case where the status request command was transmitted but status information could not subsequently be acquired from the printer, with the likelihood that the status request command could not be processed correctly on the side of printer 2001. Processing from step S1012 onward is as described above.

Processing for analyzing the status information received in response to the status request command transmitted to the printer at step S1008 is executed at step S1010. The status information transmitted from the printer 2001 is illustrated in FIGS. 4 and 5, by way of example. The status information has, at the leading end thereof, two bytes of length information indicating the overall number of bytes of the status information transmitted, and this is followed by information representing the actual status. In the examples of FIGS. 4 and 5, error information (ERR) and warning information (WRN) are "0", which indicates that an error and warning have not been produced. Further, page information (PAG) is "0", which indicates that the printer is not executing print processing. Ink-replacement operation information (CHG) is "1" in the example of FIG. 4, which indicates the possibility that an ink replacement-operation has been performed, and is "0" in the example of FIG. 5, which indicates no possibility that an ink replacement operation has been performed.

This is followed by step S1011. If the result of the analysis performed at step S1010 is that the content of the ink-replacement operation information (CHG) is a value indicating the possibility that the ink replacement operation has been performed, control proceeds to step S1018. If the result is that the content of the information (CHG) is a value indicating no possibility that the ink replacement operation has been performed, then control proceeds to step S1015.

Processing from step S1018 onward is that for the case where there is a possibility that the ink replacement operation was performed at the printer 2001 during the period of time from the preceding job to the present job. In this case, the data-transfer control program queries the user as to whether the ink replacement operation was actually performed. This is done before the program starts transferring print-job data to the printer 2001. In a case where the ink replacement operation has actually been performed, control is performed in such a manner that the print-job data is transferred after a command specifying initialization of the information relating to the remaining amount of replaced ink is transmitted to the printer 2001.

At step S1018, therefore, first the dialog box illustrated in FIG. 7 is displayed and an input from the user is accepted. The dialog box shows the user that there is a possibility that ink replacement was performed and requests an entry as to whether the ink replacement operation was actually performed.

Next, at step S1019, entries made by the user in the dialog boxes of FIGS. 7 and 8 are discriminated. If the user has clicked a "NO" button in the dialog box of FIG. 7, this is regarded as indicating that ink replacement has not been performed, and control proceeds to step S1022. If the user has clicked the "YES" button, on the other hand, then the dialog box of FIG. 7 vanishes and the dialog box shown in FIG. 8 is displayed anew. This display is presented at step S1019 in FIG. 2.

The dialog box of FIG. 8 has check boxes for specifying the type of ink tank replaced. By selecting the ink tank replaced and clicking the "OK" button, the user can enter which ink tank was replaced. The dialog box of FIG. 8 immediately after it is displayed shows that neither check box has been selected. In this state in which neither check box has been selected, the "OK" button is not selectable.

If the "OK" button has been selected in FIG. 8, control proceeds to step S1020. If the "CANCEL" button has been selected, on the other hand, then this dialog box vanishes and the dialog box of FIG. 7 is displayed again.

The status information of the printer 2001 is acquired again and, if acquisition succeeds, the content thereof is analyzed at step S1020. The value of the ink-replacement operation information included in the latest status information acquired from the printer 2001 is checked. If the ink-replacement operation information indicates the possibility that ink replacement was performed, i.e., if the response to the CHG command is "1", control proceeds to step S1021. If the ink-replacement operation information indicates no possibility that ink replacement was performed, i.e., if the response to the CHG command is "0", control proceeds to step S1015.

The status information is acquired again at step S1020 in order to take into consideration a case where the printer is controlled from a plurality of host computers. In such case, all of the host computers that utilize the printer 2001 manage remaining amount of ink through the procedure of FIG. 2. A certain host computer executes the procedure of FIG. 2, transmits an ink-information initializing command, which specifies initialization of the information relating to remaining amount of ink, to the printer 2001 by the processing of step S1021 (described later), and construes that the printer 2001 has consumed ink by execution of processing such as printing by transmission of job data performed next. In this case, if another host computer is executing the procedure of FIG. 2 concurrently, this computer will again send the printer 2 a command specifying initialization of information relating to remaining amount of ink. As a consequence, regardless of the fact that the remaining amount of ink that reflects amount of ink consumption from the first-mentioned host computer has been recorded in the EEPROM 2008 of printer 2001 as residual-ink information, this information will be erased by the initializing command from the second-mentioned host computer. Step S1020 is processing for avoiding this redundant transmission of the residual-ink initializing command. If acquisition of status information fails at step S1020, control branches to step S1015.

At step S1021, before job data is transmitted to the printer 2001, the printer 2001 is sent a command that specifies initialization of the information (residual-ink information) relating to remaining amount of ink in printer 2001 as well as a change from the information (ink-replacement operation information) indicating the possibility that ink replacement was performed to content (i.e., "0") indicating that the ink replacement was not performed. This ink-information initializing command is issued based upon an entry by the user in response to the dialog box of FIG. 8 displayed at step S1019. The command has a format of the kind shown in FIG. 9, by way of example. The ink-information initializing command shown in FIG. 9 includes an escape sequence (1Bh, "C", "M", "D"), which indicates that the command is a control command, and succeeding 2-byte information representing the command size and a command (RST) specifying the resetting of information relating to remaining amount of ink concerning a black-ink tank (BK) and a color-ink tank (CL). Upon receiving this command, the printer 2001 resets the residual-ink information of the specified ink tank and establishes a state representing remaining amount of ink in the new ink tank. In addition, the printer 2001 stores information indicating that the ink replacement operation has not been performed as the ink-replacement operation information.

At step S1022, before job data is transmitted to the printer 2001, the printer 2001 is sent a command that specifies a change from the information (ink-replacement operation information) indicating the possibility that ink replacement was performed to content (i.e., "0") indicating that the ink replacement was not performed. This ink-replacement-operation-information initializing command is has a format of the kined shown in FIG. 10, by way of example.

The ink-replacement-operation-information initializing command shown in FIG. 10 includes an escape sequence (1Bh, "C", "M", "D"), which indicates that the command is a control command, and succeeding 2-byte information representing the command size and a command (RST=NO) specifying the no-resetting of information relating to remaining amount of ink concerning any ink tank and changing only the ink-replacement operation information to information indicating that the ink replacement operation has not been performed. Upon receiving this command, the printer 2001 does not reset the residual-ink information of the specified ink tank and changes only the ink-replacement operation information to a value indicating that the ink-replacement operation has not performed.

At step S1015, data of the print job specified for transmission from the print spooler to the printer is transmitted to the printer 2001. Further, processing for acquiring the status information of the printer 2001 is executed. This is followed by step S1016, at which the data-transfer control program determines whether there is a designation of data transmission from the print spooler. As long as there is such a designation, this processing (S1015) is repeated. If job end is designated, control proceeds to step S1017 after it is confirmed, by status information received from the printer 2001, that processing by the printer has been completed. Confirmation of end of processing by the printer is performed by a decision based upon the above-described PAG status.

Processing for closing the port used is executed at step S1017, thereby completing one series of job processing operations. Thereafter, processing from step S1002 onward is repeated until a quit request is issued by the print spooler.

Thus, as set forth above, by executing the foregoing series of processing operations at the time of data transfer processing by the host computer 1001, processing for resetting information relating to remaining amount of ink in a case where ink replacement has been performed can be executed easily and reliably in a printing system comprising a printer and a host computer in an arrangement in which remaining amount of ink is obtained from a cumulative total of amount of ink used.

Furthermore, in a case where a plurality of host computers are connected to a single printer in this printing system and an operation for resetting information relating to remaining amount of ink is performed independently at each of a plurality of host computers, it is possible to prevent the above-mentioned problem in which this reset processing is executed a number of times, causing the residual-ink information not to reflect the correct remaining amount of ink.

Modifications of the Embodiment (1) In the above embodiment, a system that utilizes a printer in which remaining amount of ink is sensed based upon amount of ink used is described. The present invention is applicable to any printer so long as the remaining amount of colorant is sensed through a principle similar to that of the printer of the above embodiment. Examples of printers to which the invention is applicable include an ink-jet printer utilizing ink as a liquid colorant, an electrophotographic printer that employs toner as the colorant, and a printer using an ink ribbon.

(2) In the above embodiment, it is assumed that the printer is a color printer. However, the invention is applicable to a monochrome printer as well. In this case, the entry screen of FIG. 8 is unnecessary. If the user selects "YES" on the screen of FIG. 7, therefore, control branches from step S1019 to step S1020 without the screen of FIG. 8 being displayed.

(3) What can be selected on the screen of FIG. 8 is "BLACK-INK TANK" or "COLOR-INK TANK". The example of FIG. 8 concerns a printer that utilizes a color cartridge, which is a combination of Y, M, C color-ink tanks, and a black-ink tank, and manages the remaining amount of ink in each. Accordingly, with regard to a printer of the type that manages remaining amount of ink of each of the colors Y, M, C, K, a check box is displayed for each of the colors Y, M, C, K and the tank replaced is allowed to be selected. A command is issued at step S1021 in FIG. 2 in order to initialize the remaining amount of ink of the selected color.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the invention is attained also by supplying a recording medium (or storage medium) on which the program codes of the software for performing the functions of the foregoing embodiment to a system or an apparatus have been recorded, reading the program codes with a computer (e.g., a CPU or MPU) of the system or apparatus from the recording medium, and then executing the program codes.

In this case, the program codes read from the recording medium themselves implement the novel functions of the embodiment, and the program codes per se and recording medium storing the program codes constitute the invention.

Further, besides the case where the aforesaid functions according to the embodiment are implemented by executing the program codes read by a computer, it goes without saying that the present invention covers a case where an operating system or the like running on the computer performs a part of or the entire process based upon the designation of program codes and implements the functions according to the embodiment.

It goes without saying that the present invention further covers a case where, after the program codes read from the recording medium are written in a function expansion card inserted into the computer or in a memory provided in a function expansion unit connected to the computer, a CPU or the like contained in the function expansion card or function expansion unit performs a part of or the entire process based upon the designation of program codes and implements the function of the above embodiment.

In a case where the present invention is applied to the above-mentioned recording medium, program code corresponding to the flowcharts described earlier is stored on the recording medium.

Thus, as described above, initialization of information relating to remaining amount of colorant, which is necessary when the colorant is replaced, can be performed easily and reliably in a printer that manages remaining amount of colorant based upon amount of colorant used.

Further, it is possible to avoid the troublesome task in which the user must make an input relating to replaced colorant in a case where an operation that is not accompanied by consumption of colorant has been performed.

Further, it is possible to avoid sending a printer a command for initializing information relating to remaining amount of colorant a number of times even in a case where the operation for initializing the information relating to remaining amount of colorant is performed at the same time from a plurality of printer control apparatus, and therefore it is possible to avoid improper initialization of the information relating to amount of toner remaining in the printer.

Further, information relating to remaining amount of a colorant can be initialized in regard to a replaced colorant, and management of remaining amount of colorant can be performed accurately.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus, comprising:
a first determination unit constructed to determine whether or not a status received from a printer contains information indicating that an operation with possible replacement of a color material has been carried out;

a display unit constructed to display a screen image accepting an input from a user indicating whether the color material has been replaced or not when it is determined by said first determination unit that the stats received from the printer contains information indicating that an operation with possible replacement of the color material has been carried out;

a second determination unit constructed to determine whether or not the input from the user indicates that replacement of the color material has been carried out; and a transmission unit constructed to transmit a command for initializing color material information to the printer when it is determined that the input from the user indicates that a replacement of the color material has been carried out;

wherein the printer includes a memory for storing the information indicating that an operation with possible replacement of a color material has been carried out, and wherein the information is recorded in the memory at a timing when a cover of the printer to be opened for replacement of the color material is opened, or when a button of the printer for causing a carriage on which a print head is mounted to move to a home position is manipulated.

2. An apparatus according to claim 1, wherein the command for initializing the color material information includes a command for initializing information concerning a remaining amount of the color material.

3. An apparatus according to claim 1, wherein the command for initializing the color material information includes a command for changing the information, stored in the memory, indicating that an operation with possible replacement of the color material has been carried out into information indicating that an operation with possible replacement of the color material has not been carried out.

4. An apparatus according to claim 1, wherein said transmission unit transmits a command for initializing color material information to the printer when it is determined by said first determination unit that the status received from the printer contains information indicating that an operation with possible replacement of the color material has been carried out in addition when it is determined by said second determination unit that the input from the user indicates that a replacement of the color material has been carried out.

5. An information processing method, comprising:

a first determination step for determining whether or not a status received from a printer contains information indicating that an operation with possible replacement of a color material has been carried out;

a display step for displaying a screen image accepting an input from a user indicating whether the color material has been replaced or not when it is determined in said first determination step that the status received from the printer contains information indicating that an operation with possible replacement of the color material has been carried out;

a second determination step for determining whether or not the input from the user indicates that replacement of the color material has been carried out; and a transmission step for transmitting a command for initializing color material information to the printer when it is determined that the input from the user indicates that a replacement of the color material has been carried out;

wherein the printer includes a memory for storing the information indicating that an operation with possible replacement of a color material has been carried out, and wherein the information is recorded in the memory at a timing when a cover of the printer to be opened for replacement of the color material is opened, or when a button of the printer for causing a carriage on which a print head is mounted to move to a home position is manipulated.

6. A method according to claim 5, wherein the command for initializing the color material information includes a command for initializing information concerning a remaining amount of the color material.

7. A method according to claim 5, wherein the command for initializing the color material information includes a command for changing the information, stored in the memory, indicating that an operation with possible replacement of the color material has been carried out into information indicating that an operation with possible replacement of the color material has not been carried out.

8. A method according to claim 5, wherein said transmission unit transmits a command for initializing color material information to the printer when it is determined by said first determination unit that the status received from the printer contains information indicating that an operation with possible replacement of the color material has been carried out in addition when it is determined by said second determination unit that the input from the user indicates that a replacement of the color material has been carried out.

9. A computer-readable memory medium having computer-executable process steps stored thereon, wherein said process steps cause an information processing apparatus to execute steps comprising:

a first determining step to determine whether or not a status received from a printer contains information indicating that an operation with possible replacement of a color material has been carried out;

a displaying step to display a screen image accepting an input from a user indicating whether the color material has been replaced or not when it is determined by said first determining step that the status received from the printer contains information indicating that an operation with possible replacement of the color material has been carried out;

a second determining step to determine whether or not the input from the user indicates that replacement of the color material has been carried out; and a transmitting step to transmit a command for initializing color material information to the printer when it is determined that the input from the user indicates that a replacement of the color material has been carried out;

wherein the printer includes a memory for storing the information indicating that an operation with possible replacement of a color material has been carried out, and wherein the information is recorded in the memory at a timing when a cover of the printer to be opened for replacement of the color material is opened, or when a button of the printer for causing a carriage on which a print head is mounted to move to a home position is manipulated.

10. A computer-readable memory medium according to claim 9, wherein the command for initializing the color material information includes a command for initializing information concerning a remaining amount of the color material.

11. A computer-readable memory medium according to claim 9, wherein the command for initializing the color material information includes a command for changing the information, stored in the memory, indicating that an operation with possible replacement of the color material has been carried out into information indicating that an operation with possible replacement of the color material has not been carried out.

12. A computer-readable memory medium according to claim 9, wherein said transmission unit transmits a command for initializing color material information to the printer when it is determined by said first determination unit that the status received from the printer contains information indicating that an operation with possible replacement of the color material has been carried out in addition when it is determined by said second determination unit that the input from the user indicates that a replacement of the color material has been carried out.

* * * * *